United States Patent [19]
Jiang

[11] Patent Number: 5,894,414
[45] Date of Patent: Apr. 13, 1999

[54] THREE PHASE RECTIFIER USING THREE SINGLE PHASE CONVERTERS AND A SINGLE DC/DC CONVERTER

[75] Inventor: Yimin Jiang, Plano, Tex.

[73] Assignee: Lucent Technologies Inc., Murray Hill, N.J.

[21] Appl. No.: 08/811,444

[22] Filed: Mar. 3, 1997

[51] Int. Cl.[6] .................................................. H02M 7/06
[52] U.S. Cl. ........................................... 363/65; 363/67
[58] Field of Search .............................. 363/65, 67, 69, 363/125; 307/82

[56] References Cited

U.S. PATENT DOCUMENTS

| | | | |
|---|---|---|---|
| 3,135,910 | 6/1964 | Hamilton | 363/67 |
| 4,622,629 | 11/1986 | Glennon | 363/70 |
| 4,739,466 | 4/1988 | Glennon et al. | 363/89 |
| 4,866,591 | 9/1989 | Cook et al. | 363/67 |
| 5,267,137 | 11/1993 | Goebel | 363/69 |
| 5,398,182 | 3/1995 | Crosby | 363/89 |
| 5,406,470 | 4/1995 | Ridley et al. | 363/69 |

*Primary Examiner*—Adolf Deneke Berhane

[57] ABSTRACT

A power converter for converting three phase input power to DC output power and a method of effecting such conversion. The power converter includes: (1) three single phase DC converters, each having outputs, that receive the three phase input power, (2) a DC/DC converter coupled to the outputs of the three single phase DC converters and (3) a converter selection circuit, associated with the three single phase DC converters, that selects a selected subset of the three single phase DC converters as a function of an electrical characteristic of each phase of the three phase input power to conduct a portion of the three phase input power to the DC/DC converter, the converter selection circuit permitting the power converter to operate on the three phase power with less than three DC/DC converters.

20 Claims, 9 Drawing Sheets

THREE PHASE RECTIFIER USING THREE SINGLE PHASE CONVERTERS AND A SINGLE DC/DC CONVERTER

TECHNICAL FIELD OF THE INVENTION

The present invention is directed, in general, to power converters and, more specifically, to a three phase rectifier that uses three single phase stages (one for each incoming phase) and a single DC/DC converter to convert power from all three incoming phases.

BACKGROUND OF THE INVENTION

Power converters that use pulse-width modulation techniques to convert three-phase AC input power to one or more DC power levels are widely known. These converters typically comprise three individual converter stages that may be connected in either a delta or a wye configuration. In a delta configuration, each converter stage is coupled between two of the three phases, φA, φB and φC. In a wye configuration, each single phase stage is coupled between a single phase and neutral. In each stage, a switch is closed to generate an increasing current in an inductor that is coupled to one of the phase inputs. When the switch is opened, the current in the inductor is diverted to a large storage capacitor. The current that is pumped onto the storage capacitor when the switch is open creates a DC voltage on the capacitor.

Since the voltage on the storage capacitor in each single phase stage is not at the same level as the voltages on the storage capacitors in the other stages, the stage outputs cannot be coupled in parallel. Therefore, each large storage capacitor is coupled to a separate DC/DC converter. The outputs of the three isolated DC/DC converters may then be coupled together to form a single DC supply, where each stage provides one third of the total output power.

The above-described power device thus converts a three-phase AC input to a DC level using three single-phase boosts and three DC/DC converters. This architecture contains a considerable number of redundant components. This adds to the cost of the power device, increases the amount of circuit board area required by the power device, and adds additional weight to any system in which the power device is installed.

Accordingly, what is needed in the art is an improved power supply converter that minimizes the number of components needed to convert three phase power to a DC level. In particular, there is a need in the art for an improved power supply converter that utilizes only a single DC/DC converter to convert DC outputs received from three separate converter stages.

SUMMARY OF THE INVENTION

To address the above-discussed deficiencies of the prior art, the present invention provides a power converter for converting three phase input power to DC output power and a method of effecting such conversion. The power converter includes: (1) three single phase converters, each having outputs, that receive the three phase input power, (2) a DC/DC converter coupled to the outputs of the three single phase converters and (3) a converter selection circuit, associated with the three single phase converters, that selects a selected subset of the three single phase converters as a function of an electrical characteristic of each phase of the three phase input power to conduct a portion of the three phase input power to the DC/DC converter, the converter selection circuit permitting the power converter to operate on the three phase power with less than three single phase DC/DC converters.

The present invention therefore introduces a way of selecting which one(s) of multiple single phase converters are to be coupled to the single DC/DC converter to allow fewer than the previously required number of DC/DC converters to be employed in a three-phase power converter. Those skilled in the art will recognize, however, that the present invention remains advantageously operable with more than one DC/DC converter.

In one embodiment of the present invention, the electrical characteristic is voltage. Alternatively, the electrical characteristic could be current or another appropriate characteristic.

In one embodiment of the present invention, the three single phase converters are coupled in a delta configuration to receive the three phase input power. In an alternative embodiment of the present invention, the three single phase converters are coupled in a wye configuration to receive the three phase input power.

In one embodiment of the present invention, the selected subset consists of ones of the three single phase converters coupled to a lowest voltage phase of the three phase input power. In an alternative embodiment of the present invention, the selected subset consists of ones of the three single phase converters coupled to positive voltage phases of the three phase input power. In various embodiments to be illustrated and described, the optimal selected subset is a function of the configuration of the three single phase converters (delta or wye). However, those skilled in the art will understand that the selected subset may be independent of converter configuration.

In one embodiment of the present invention, the converter selection circuit includes active switches that select the selected subset. Depending upon the state of the three incoming phases, the active switches may be closed or opened to select corresponding single phase converters. Those skilled in the art will understand, however, that the present invention is not limited to a particular converter selection circuit topology.

The foregoing has outlined, rather broadly, preferred and alternative features of the present invention so that those skilled in the art may better understand the detailed description of the invention that follows. Additional features of the invention will invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
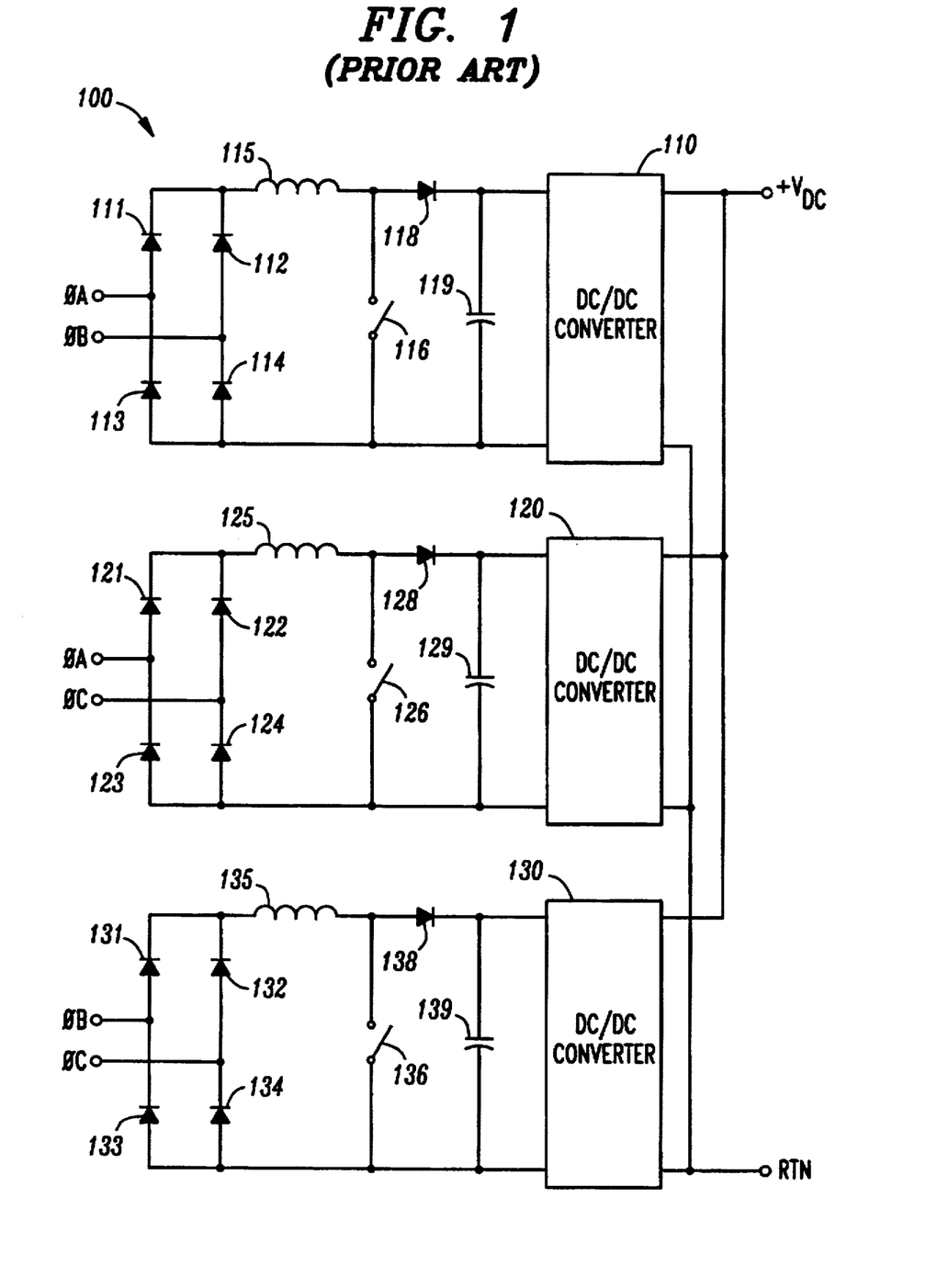
FIG. 1 illustrates a three-phase power supply using three single phase converters and three DC/DC converters according to the prior art.

Referring initially to FIG. 1, there is illustrated three-phase power supply 100, which uses three single phase converters and three DC/DC converters in accordance with the prior art. Those skilled in the art will recognize that the stages are coupled in a delta configuration, rather than a wye configuration, to the three input phases. The operations of power supply 100 and the stages therein are widely understood, but will be briefly discussed here so that the discussion below of the present invention may he more readily understood.

Circuit elements 111-119 comprise a first converter stage that is coupled between phase A ($\phi$A) and phase B ($\phi$B) of a three-phase AC power source. As will be explained in greater detail below, the stage employs high-frequency pulse width modulation ("PWM") switching of switch 116 to draw current through inductor 115 and store the energy onto large storage capacitor 119. Diodes 111-114 form an input rectification stage. When $\phi$A is greater than $\phi$B, current flows through input diode 111 into the rest of the stage and returns through diode 114. When ($\phi$B is greater than $\phi$A, current flows through input diode 112 into the rest of the stage and returns through diode 113. Therefore, the voltage waveform at the junction of inductor 115 and diodes 111 and 112 is a rectified sinewave.

Switch 116 is opened and closed (i.e., pulsed) at high frequency, for example, 50 KHz. When switch 116 is closed, the current level in inductor 115 ramps up continuously. When switch 116 is opened, the current in inductor 115, which cannot turn off instantly, is diverted through diode 118 and flows onto capacitor 119, thereby maintaining the voltage level on capacitor 119. The current in inductor 115 decreases (ramps down) while the current is being stored on capacitor 119.

The voltage on capacitor 119 is sensed and a feedback circuit (not shown) adjusts the width of the pulses used to open and close switch 116. If the voltage level on capacitor 119 is too low, the pulse width is increased, so that switch 116 is closed for a longer period of time. This causes the current in inductor 115 to ramp up to a higher level right before switch 116 is opened. This higher current level stores a greater amount of charge on capacitor 119 when switch 116 is open, thereby raising the voltage on capacitor 119.

Conversely, if the voltage level on capacitor 119 is too high, the pulse width is decreased, so that switch 116 is closed for a shorter period of time. This allows the current in inductor 115 to ramp up only to a relatively smaller peak level right before switch 116 is opened. This relatively lower current level stores a smaller amount of charge on capacitor 119 when switch 116 is open, thereby lowering the voltage on capacitor 119.

In this way, pulse-width modulation is used to vary the duty cycle of switch 116 and thereby control the voltage level on capacitor 116 as the load (current drain) caused by DC/DC converter 110 changes. At equilibrium, the amount of charge stored capacitor 119 when switch 116 is open is equal to the amount of charge drained from capacitor 119 by DC/DC converter 110 during each switch cycle.

The operation of the other two single phase converter stages is virtually identical to that described above. Circuit elements 121-129 are coupled between phase A ($\phi$A) and phase C ($\phi$C) of a three-phase AC power source and build up a voltage on large storage capacitor 129 that is used to feed DC/DC converter 120. Similarly, circuit elements 131-139 are coupled between phase B ($\phi$B) and phase C ($\phi$C) of a three-phase AC power source and build up a voltage on large storage capacitor 139 that is used to feed DC/DC converter 130. The three outputs of DC/DC converters 110, 120 and 130, which include primary-to-secondary isolation, are tied together to provide a stable DC power supply voltage $+V_{DC}$. Each DC/DC converter converts the DC voltage level on the storage capacitor on its input to a different, usually lower, output DC level. Each of the three stages provides one third of the total output power.

The three single phase converter stages in the above-described prior art converter are not at the same potential and cannot all be in parallel. Thus, three separate DC/DC converters are necessary. This requires more hardware and increases cost. The extra converters also consume valuable circuit board real estate. AS will be explained below, the present invention improves on the prior art by using a single DC/DC converter and employing a switching interface that selectively applies the single phase converter stages to the single DC/DC converter.

The prior art single phase converters described above, and the single phase converters that will be described below in connection with the present invention, are commonly referred to as "boost" converters. Boost converters generate a DC voltage on the large storage capacitor in each stage that is greater than the peak AC voltage used to feed each converter stage. In this way, the converters "boost" the AC voltage to a higher DC level. However, those skilled in the art will recognize that the principles of the present invention may be readily applied to other types of single phase converters that produce DC output voltages. For example, the present invention may be used to couple three single phase "buck" converter stages to a single DC/DC converter. Buck converters convert an AC input voltage to a lower DC level. Therefore, the use of boost converter stages in the following descriptions is by way of illustration only and should not be construed to limit the applicability of the present invention to boost converter stages.

Figure 2:
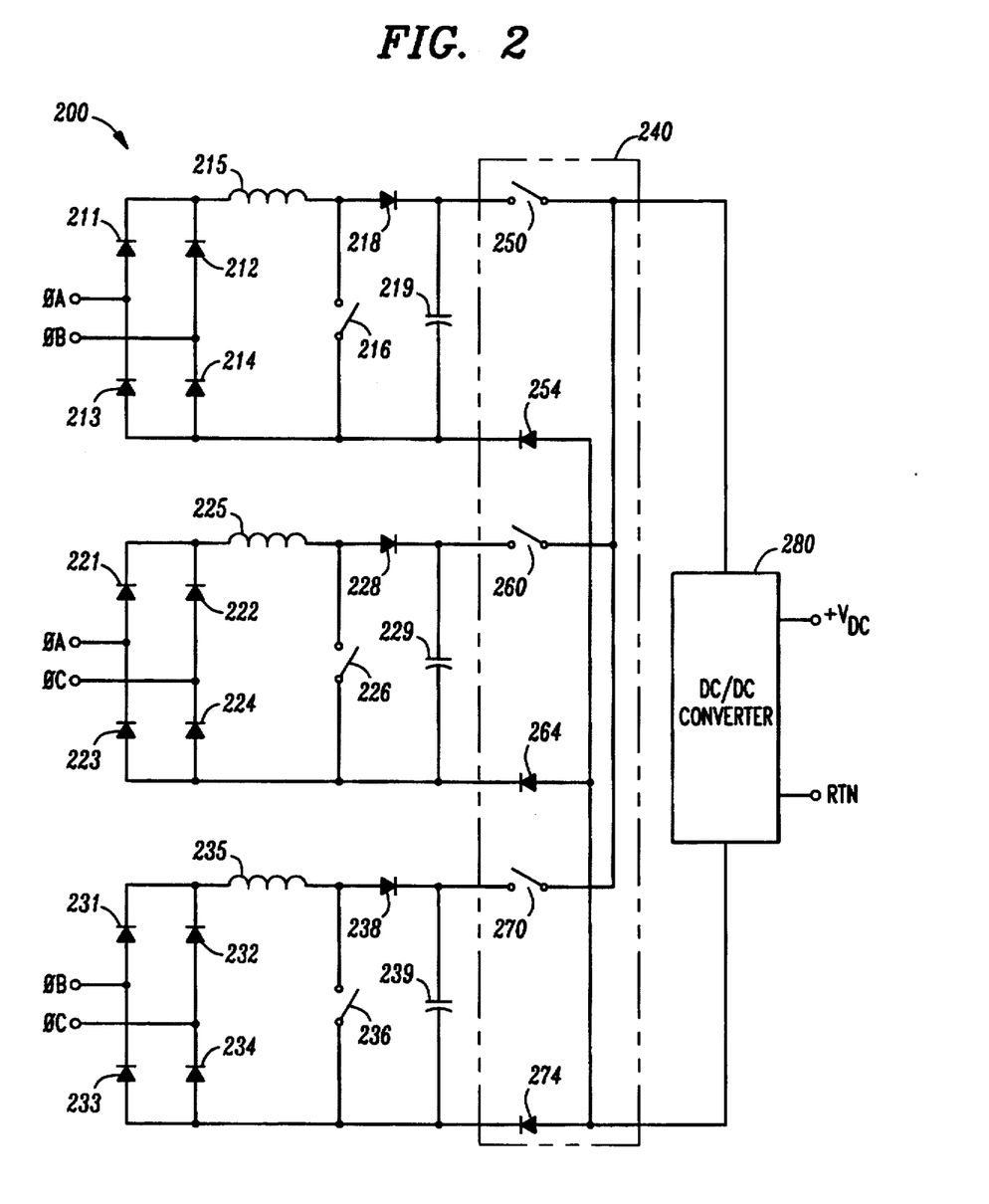
FIG. 2 illustrates a three-phase power supply using three single phase converters in a delta connection and a single DC/DC converter according to a first embodiment of the present invention.

FIG. 2 illustrates three-phase power supply 200, which uses three single phase boost converters in a delta connection and a single DC/DC converter according to a first embodiment of the present invention. Circuit elements 211–219 comprise a first boost stage that is coupled between phase A (φA) and phase B (φB). A feedback circuit (not shown) is used to open and close switch 216 in order to perform pulse width modulation (PWM) to control the voltage level on capacitor 219. Similarly, circuit elements 221–229 comprise a second boost stage that is coupled between φA and φC of the three-phase power source, and circuit elements 231–239 comprise a third boost stage that is coupled between φB and φC of the three-phase power source. Thus, DC voltages are built up on large storage capacitors 219, 229 and 239.

Interface 240 comprises low-frequency switches 250, 260 and 270, which selectively couple the storage capacitors 219, 229 and 239 to the input terminal of DC/DC converter 280. Interface 240 is essentially a converter selection circuit that selectively couples subsets of the three boost converter stages to DC/DC converter 280. The voltage levels of φA, φB and φC are sensed and feedback circuits (not shown) are used to selectively close switches 250, 260 and 270. Two of the three boost converter stages that are connected to the most negative phase can be in parallel to feed the input of DC/DC converter 280. For example, if φB is the most negative phase, switches 250 and 270 may be closed to couple storage capacitors 219 and 239 to DC/DC converter 280. Finally, diodes 254, 264 and 274 are used as returns for the supply current in each of the active stages.

Figure 6A:
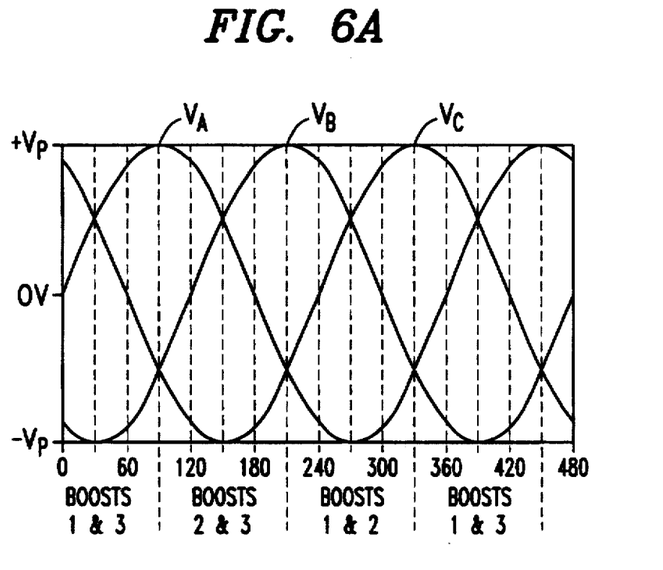
FIG. 6A illustrates the timing relationship between the three input phases and the active single phase converter stages of the three phase power supply depicted in FIG. 2.

In order to better describe the operation of power supply 200, reference is now made to FIGS. 6A and 6B. FIG. 6A illustrates the timing relationship between the three input phases and the active single phase converter stages of the three-phase power supply depicted in FIG. 2. FIG. 6A demonstrates the rule under which power supply 200 operates, namely that two of the three single phase converter stages that are connected to the most negative phase can be in parallel to feed the input of DC/DC converter 280. For example, in the region between 90° and 210°, phase C is the most negative and only the first and second single phase converter stages are active. This means that switch 260 and switch 270 are closed and switch 250 is open.

Figure 6B:
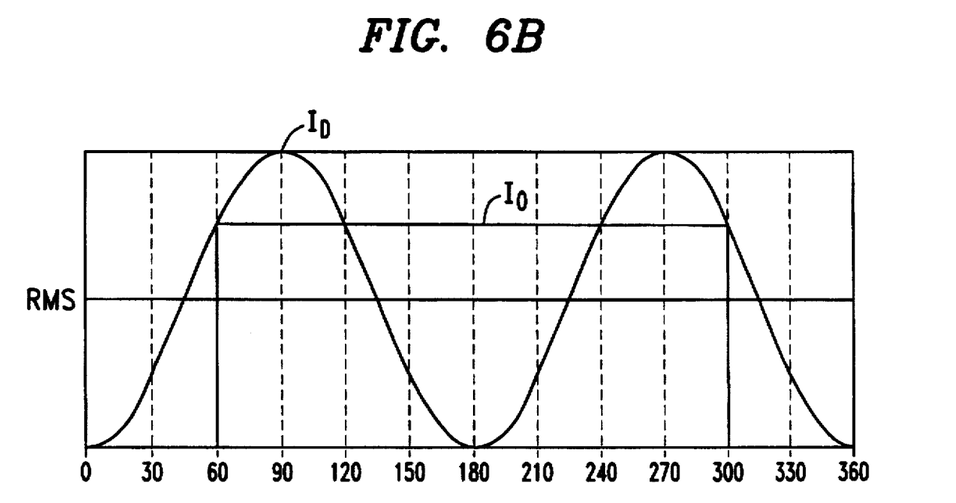
FIG. 6B illustrates the low-frequency currents for the three phase power supply depicted in FIG. 2.

FIG. 6B illustrates the low-frequency currents for the three phase power supply depicted in FIG. 2. The current $I_D$ is the current in each of diodes 218, 228 and 238, and the current $I_o$ is the current from each phase that flows into DC/DC converter 280. The low-frequency capacitor current is the difference between $I_D$ and $I_o$. The RMS value of the capacitor current is only 8% more than that in a single phase case.

Returning now to FIG. 3, there is illustrated three-phase power supply 300, which uses three single phase converters in a Wye connection and a single DC/DC converter according to a second embodiment of the present invention. It will be appreciated that the power supply 300 is identical to power supply 200, except that is the inputs are connected in a wye connection. Again, interface 240 comprises low-frequency switches 250, 260 and 270, which selectively couple the storage capacitors 219, 229 and 239 to the input terminal of DC/DC converter 280. The voltage levels of φA, φB and φC are sensed and feedback circuits (not shown) are used to selectively close switches 250, 260 and 270. Since power supply 300 is connected in a wye connection, the three return diodes 254, 264 and 274 force the return line to the level of the most negative phase voltage. Therefore, only the most negative single phase converter stage can be coupled to DC/DC converter 280 at any moment.

Figure 7A:
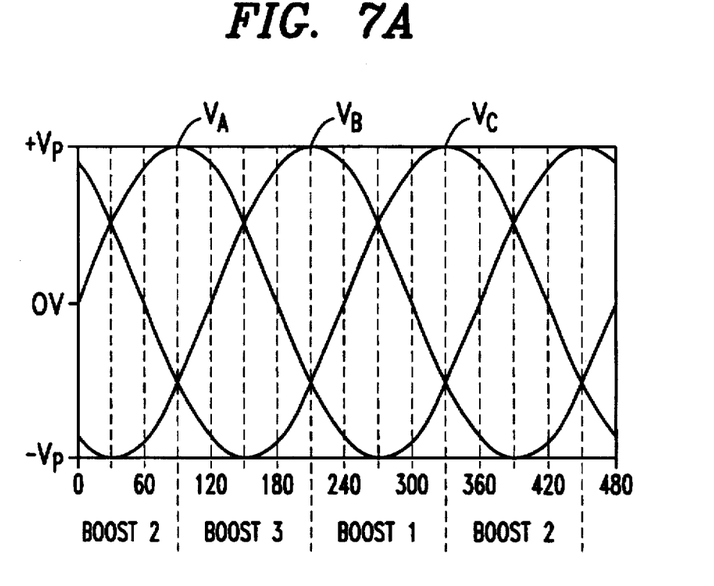
FIG. 7A illustrates the timing relationship between the three input phases and the active single phase converter stages of the three phase power supply depicted in FIG. 3.
Figure 7B:
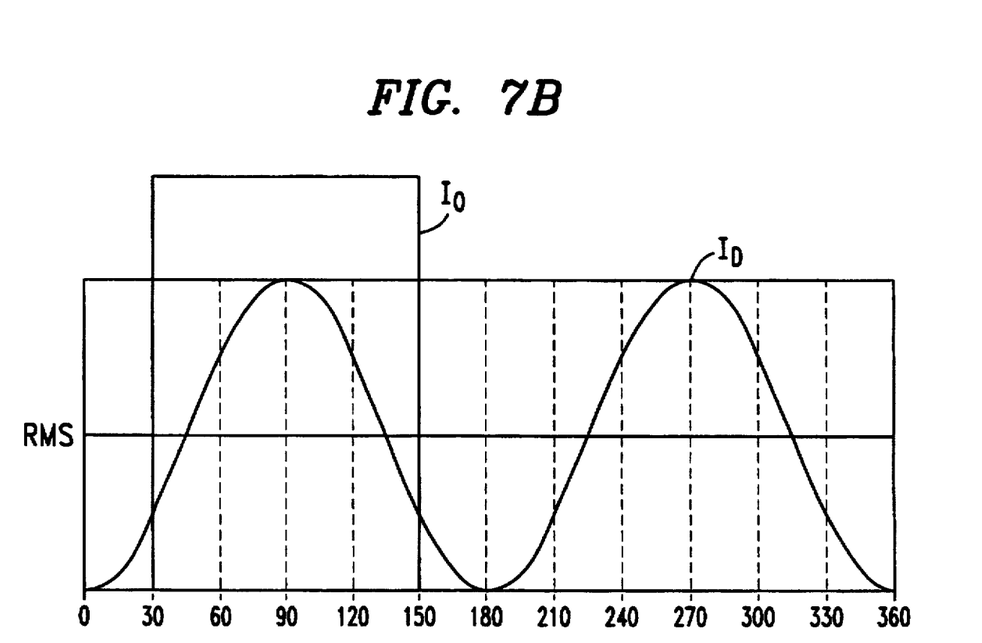
FIG. 7B illustrates the low-frequency currents for the three phase power supply depicted in FIG. 3.

Reference is now made to FIGS. 7A and 7B. FIG. 7A illustrates the timing relationship between the three input phases and the active single phase converter stages of the three-phase power supply depicted in FIG. 3. FIG. 7A demonstrates the rule under which power supply 300 operates, namely, that only the most negative single phase converter stage can be coupled to DC/DC converter 280 at a time. For example, in the region between 90° and 210°, phase C is the most negative and only phase C converter stage is active. This means that switch 270 is closed and switches 250 and 260 are open.

Figure 3:
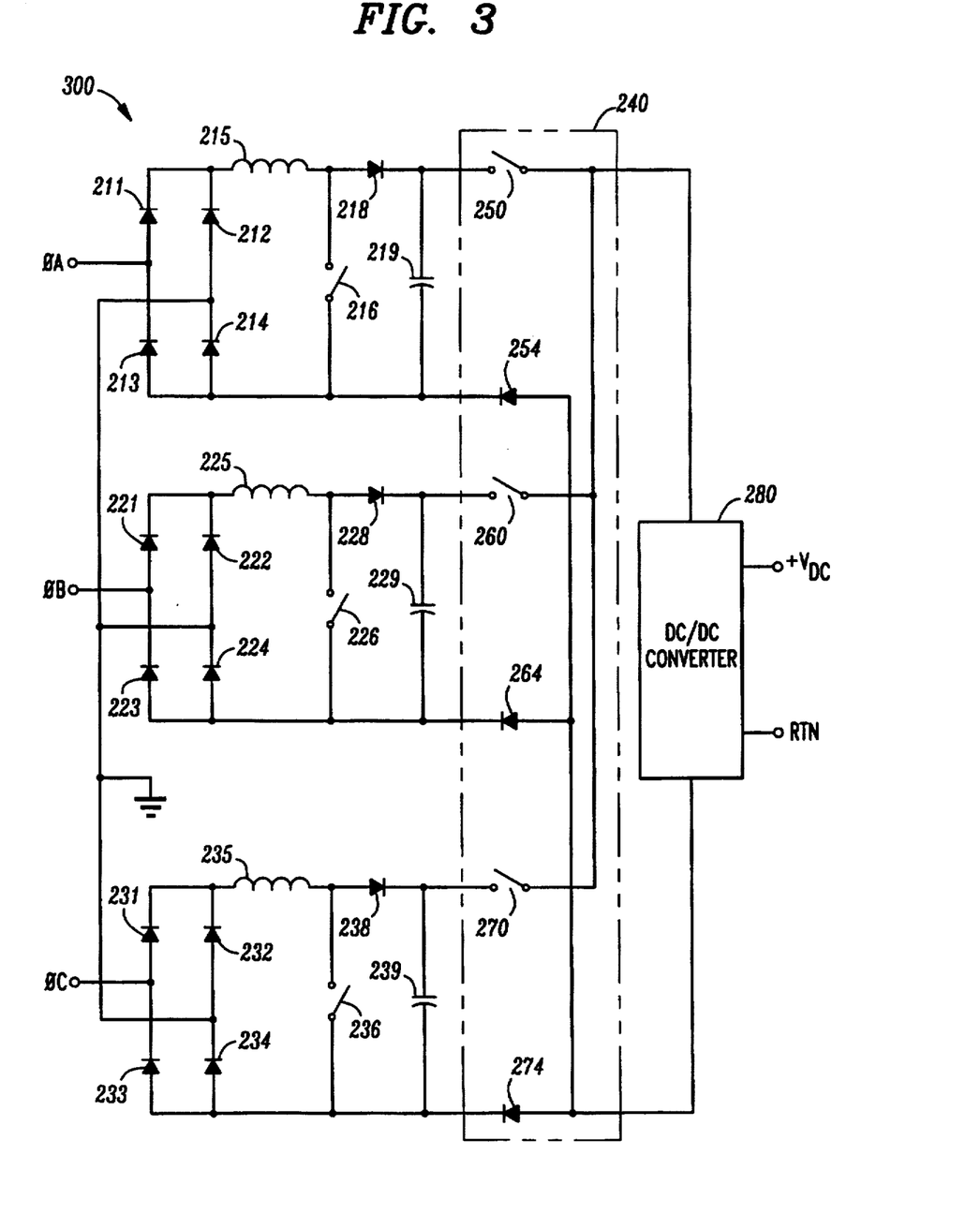
FIG. 3 illustrates a three-phase power supply using three single phase converters in a wye connection and a single DC/DC converter according to a second embodiment of the present invention.

FIG. 7B illustrates the low-frequency capacitor currents for the three phase power supply depicted in FIG. 3. The current $I_D$ is the current in each of diodes 218, 228 and 238, and the current $I_o$ is the current from each phase that flows into DC/DC converter 280. The low-frequency capacitor current is the difference between $I_D$ and $I_o$. The RMS value of the capacitor current is about 1.8 times the single phase case.

Returning now to FIG. 4, there is illustrated three-phase power supply 400, which uses three single phase converters in a delta connection and a single DC/DC converter according to a third embodiment of the present invention. Circuit elements 411–419 comprise a first stage that is coupled between phase A (φA) and phase B (φB) of, for example, a three-phase 115 VAC, 60 Hz power source. A feedback circuit (not shown) is used to open and close switch 416 in order to perform pulse width modulation to control the voltage level on capacitor 419. Similarly, circuit elements 421–429 comprise a second stage that is coupled between φA and φC of the three-phase power source, and circuit elements 431–439 comprise a third stage that is coupled between φB and φC of the three-phase power source. Thus, DC voltages are built up on large storage capacitors 419, 429 and 439.

Figure 4:
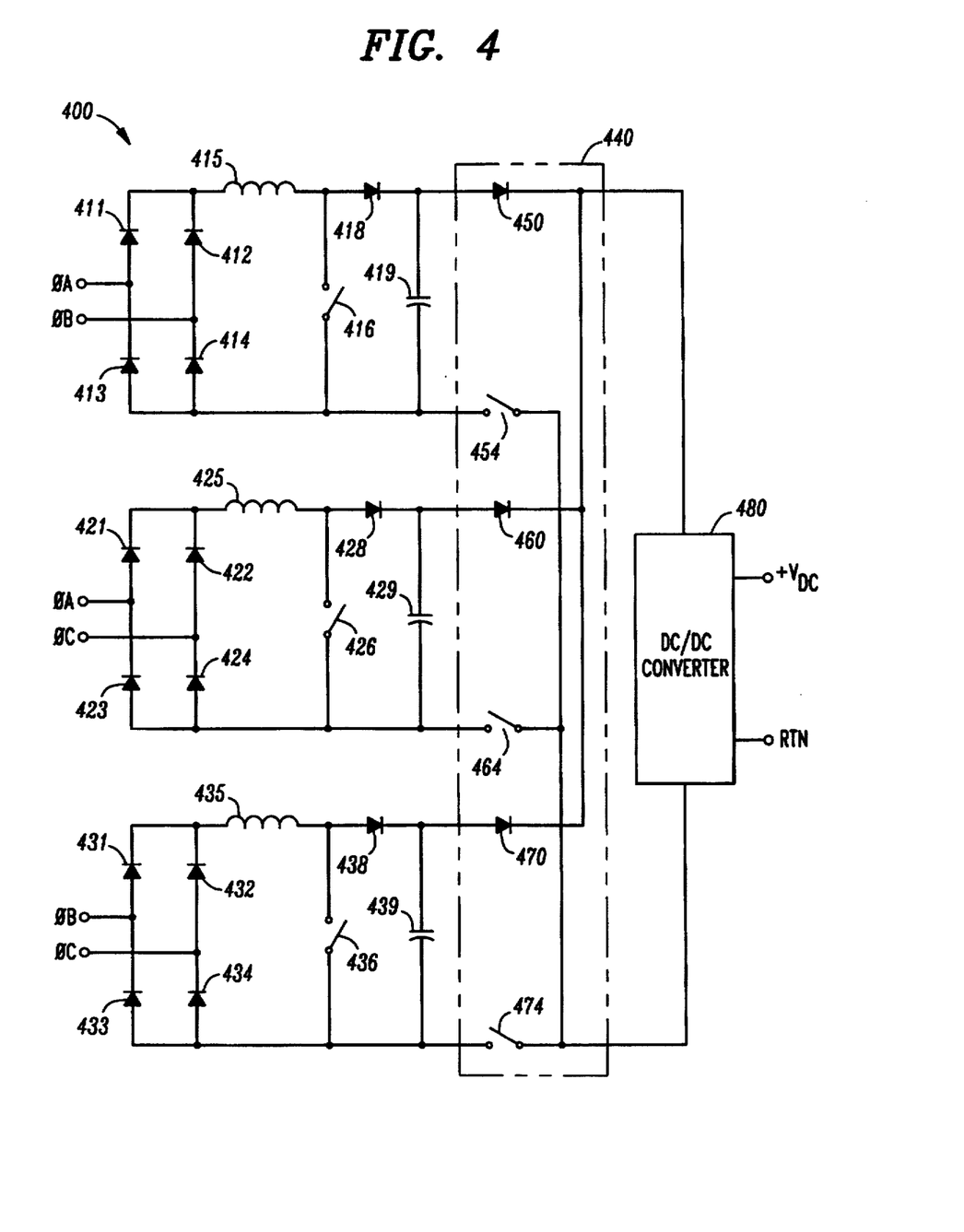
FIG. 4 illustrates a three-phase power supply using three single phase converters in a delta connection and a single DC/DC converter according to a third embodiment of the present invention.

Interface 440 comprises low-frequency switches 454, 464 and 474, which selectively couple the return lines of each of the stages to the return terminal of DC/DC converter 480. The voltage levels of φA, φB and φC are sensed and feedback circuits (not shown) are used to selectively close switches 454, 464 and 474. Only the single phase converter stage that is not connected to the most negative phase can be connected to the return of DC/DC converter 480. For example, if φC is the most negative phase, switch 454 may be closed to couple the first converter stage and the bottom of storage capacitor 419 to DC/DC converter 480. Switches 464 and 474 must then be kept open. Finally, diodes 450, 460 and 470 provide a path for the storage capacitor currents to flow into DC/DC converter 480.

Figure 8A:
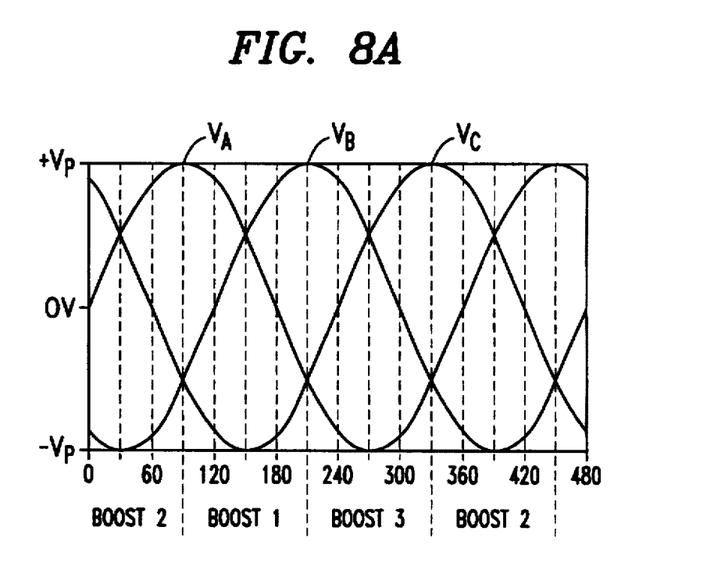
FIG. 8A illustrates the timing relationship between the three input phases and the active single phase converter stages of the three phase power supply depicted in FIG. 4.
Figure 8B:
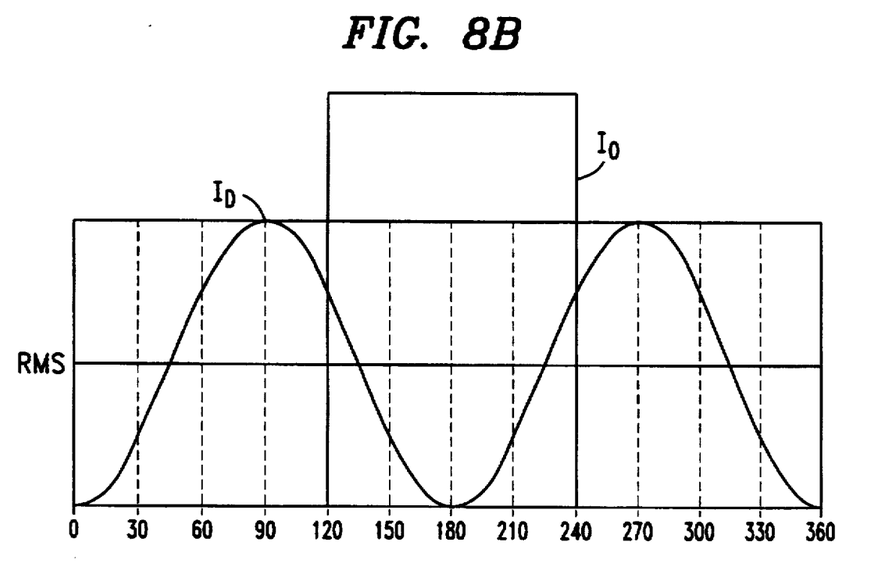
FIG. 8B illustrates the low-frequency currents for the three phase power supply depicted in FIG. 4.

In order to better describe the operation of power supply 400, reference is now made to FIG. 8A and 8B. FIG. 8A illustrates the timing relationship between the three input phases and the active single phase converter stages of the three-phase power supply depicted in FIG. 4. FIG. 8A demonstrates the rule under which power supply 400 operates, namely, that only the stage that is not connected to the most negative phase can be connected to the return of DC/DC converter 480. For example, in the region between 90° and 210°, phase C is the most negative and only the first converter stage, which is not connected to phase C, is active. This means that switch 454 is closed and switches 464 and 474 are open.

FIG. 8B illustrates the low frequency capacitor current for the three phase power supply depicted in FIG. 4, the current $I_D$ is the current in each of diodes 418, 428 and 438, and the current $I_o$ is the current from each phase that flows into DC/DC converter 480. The low-frequency capacitor current is the difference between $I_D$ and $I_o$. The RMS value of the capacitor current is about 2.6 times the single phase case.

Returning now to FIG. 5, there is illustrated three-phase power supply 500, which uses three single phase converters in a wye connection and a single DC/DC converter according to a second embodiment of the present invention. It will be appreciated that power supply 500 is identical to power supply 400, except that the inputs are connected in a wye configuration. Again, interface 440 comprises low-frequency switches 454, 464 and 474, which selectively couple the storage capacitors 419, 429 and 439 to the input terminal of DC/DC converter 480. The voltage levels of ϕA, ϕB and ϕC are sensed and feedback circuits (not shown) are used to selectively close switches 454, 464 and 474. The three top diodes 450, 460 and 470 connect the positive side of the storage capacitors to the input of DC/DC converter 480 in order to feed the load. So, in half the time when there are two positive phase voltages, the corresponding two boosts can be in parallel to feed the load. In the other half of the time, only one positive phase can feed the load.

Figure 9A:
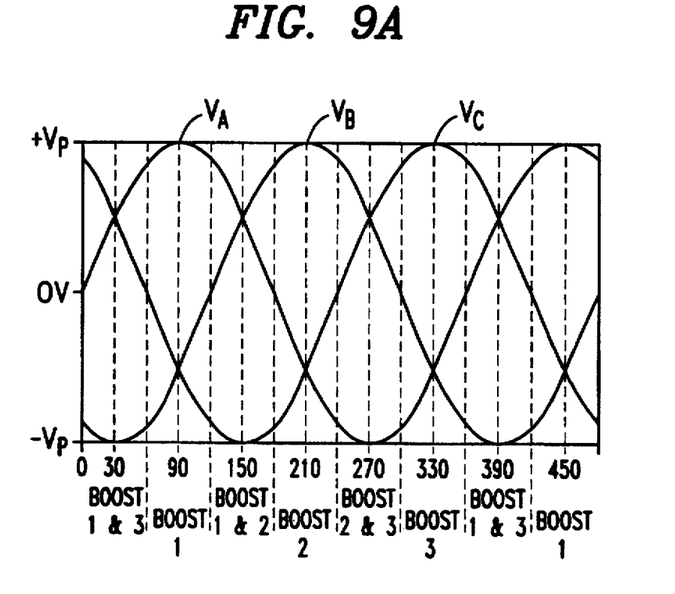
FIG. 9A illustrates the timing relationship between the three input phases and the active single phase converter stages of the three phase power supply depicted in FIG. 5.
Figure 9B:
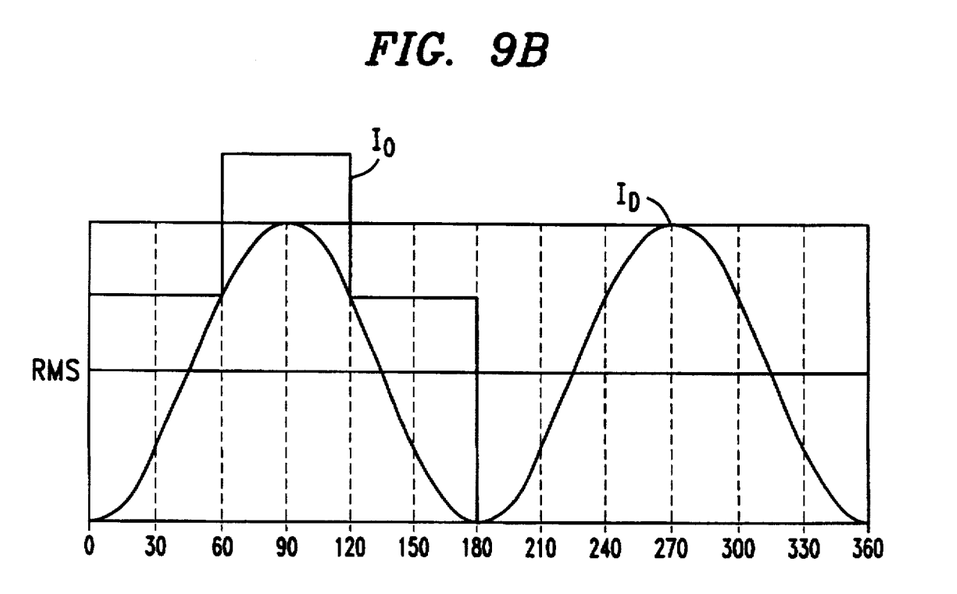
FIG. 9B illustrates the low-frequency currents for the three phase power supply depicted in FIG. 5.

Reference is now made to FIGS. 9A and 9B. FIG. 9A illustrates the timing relationship between the three input phases and the active single phase converters of the three-phase power supply depicted in FIG. 5. FIG. 9A demonstrates the rule under which power supply 500 operates, namely, that in half the time when there are two positive phase voltages, the corresponding two single phase converters can be in parallel to feed the load and in the remaining half of the time, only one positive phase can feed the load. For example, in the region between 0° and 60°, phase B is the only negative phase, so that the first and third single phase converter stages are active. This means that switches 454 and 474 are closed and switch 464 is open. In the region between 60° and 120°, phase B and phase C are both negative phases, so that only the first single phase converter stage is active. This means that switch 454 is closed and switches 464 and 474 are open.

Figure 5:
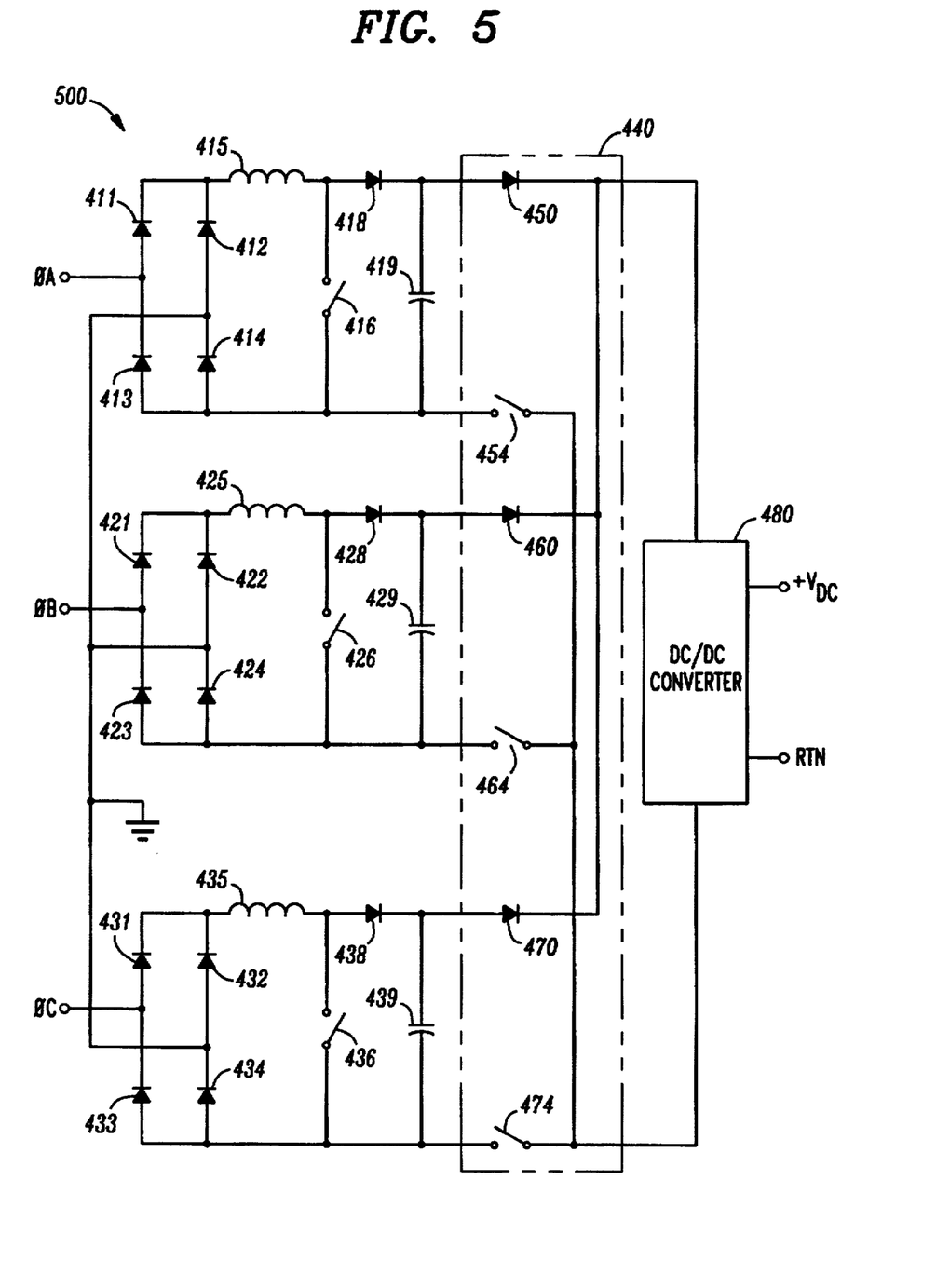
FIG. 5 illustrates a three-phase power supply using three single phase converters in a wye connection and a single DC/DC converter according to a fourth embodiment of the present invention.

FIG. 9B illustrates the low frequency capacitor current for the three phase power supply depicted in FIGURE 5. The current $I_D$ is the current in each of diodes 418, 428 and 438, and the current $I_o$ is the current from each phase that flows into DC/DC converter 480. The low-frequency capacitor current is the difference between $I_D$ and $I_o$. The RMS value of the capacitor current is about 1.4 times the single phase case.

From the foregoing it is apparent that interface 240 is more suitable for a delta configuration and interface 440 is more suitable for a wye configuration. Additionally, it will be apparent to those skilled in the art that the present invention may be used to feed parallel two DC/DC converters, rather than only one. Such a configuration will still have fewer components than the prior art device described above.

Although the present invention has been described in detail, those skilled in the art should understand that they can make various changes, substitutions and alterations herein without departing from the spirit and scope of the invention in its broadest form.

What is claim:

1. A power converter for converting three phase input power to DC output power, comprising:
three single-phase converters that receive said three phase input power, each single-phase converter having, outputs;
a DC/DC converter coupled to said outputs of said three single-phase converters; and
a converter selection circuit, associated with said three single-phase converters, that selects a selected subset of said three single-phase converters as a function of an electrical characteristic of each phase of said three phase input power to conduct a portion of said three phase input power to said DC/DC converter, said converter selection circuit permitting said power converter to convert said three phase input power to said DC output power with less than three DC/DC converters.

2. The power converter as recited in claim 1 wherein said electrical characteristic is voltage.

3. The power converter as recited in claim 1 wherein said three converters are coupled in a delta configuration to receive said three phase input power.

4. The power converter as recited in claim 1 wherein said three converters are coupled in a wye configuration to receive said three phase input power.

5. The power converter as recited in claim 1 wherein said selected subset consists of ones of said three converters coupled to a lowest voltage phase of said three phase input power.

6. The power converter as recited in claim 1 wherein said selected subset consists of ones of said three converters coupled to positive voltage phases of said three phase input power.

7. The power converter as recited in claim 1 wherein said converter selection circuit includes active switches that select said selected subset.

8. A method of converting three phase input power to DC output power, comprising the steps of:
receiving said three phase input power into three converters, each of said three converters having outputs, a DC/DC converter coupled to said outputs; and
selecting a selected subset of said three converters as a function of an electrical characteristic of each phase of said three phase input power to conduct a portion of said three phase input power to said DC/DC converter thereby to permit less than three DC/DC converters to operate on said three phase power.

9. The method as recited in claim 8 wherein said electrical characteristic is voltage.

10. The method as recited in claim 8 wherein said three converters are coupled in a delta configuration to receive said three phase input power.

11. The method as recited in claim 8 wherein said three converters are coupled in a wye configuration to receive said three phase input power.

12. The method as recited in claim 8 wherein said selected subset consists of ones of said three converters coupled to a lowest voltage phase of said three phase input power.

13. The method as recited in claim 8 wherein said selected subset consists of ones of said three converters coupled to positive voltage phases of said three phase input power.

14. The method as recited in claim 8 wherein said step of selecting comprises the step of closing active switches in a converter selection circuit.

15. A power converter for converting three phase input power to DC output power, comprising:
three converters that receive said three phase input power, each converter having outputs;
a DC/DC converter coupled to said outputs of said three converters; and
a converter selection circuit, associated with said three converters and including active switches for each of said three converters, that selects a selected subset of said three converters as a function of voltages of each phase of said three phase input power to conduct a portion of said three phase input power to said DC/DC converter, said converter selection circuit permitting said power converter to operate on said three phase power with less than three DC/DC converters.

16. The power converter as recited in claim 15 wherein said three converters are coupled in a delta configuration to receive said three phase input power.

17. The power converter as recited in claim 15 wherein said three converters are coupled in a wye configuration to receive said three phase input power.

18. The power converter as recited in claim 15 wherein said selected subset consists of ones of said three converters coupled to a lowest voltage phase of said three phase input power.

19. The power converter as recited in claim 15 wherein said selected subset consists of ones of said three converters coupled to positive voltage phases of said three phase input power.

20. The power converter as recited in claim 15 wherein said converter selection circuit includes active switches that select said selected subset.

* * * * *